United States Patent [19]

Chau

[11] Patent Number: 5,154,852

[45] Date of Patent: *Oct. 13, 1992

[54] METHOD OF MAKING LANTHANUM CERIUM TERBIUM GADOLINIUM PHOSPHATE PHOSPHOR

[75] Inventor: Chung-Nin Chau, Sayre, Pa.

[73] Assignee: GTE Products Corporation, Stamford, Conn.

[*] Notice: The portion of the term of this patent subsequent to Jul. 21, 2009 has been disclaimed.

[21] Appl. No.: 794,099

[22] Filed: Nov. 18, 1991

[51] Int. Cl.⁵ ............................................. C09K 11/81
[52] U.S. Cl. ............................................. 252/301.4 P
[58] Field of Search ............................... 252/301.4 P

[56] References Cited

U.S. PATENT DOCUMENTS 4,127,415 11/1978 Quackenbush et al. ....... 252/301.4 P
4,266,137 5/1981 Shaffer ........................ 252/301.4 P

FOREIGN PATENT DOCUMENTS 54-56086 5/1979 Japan ............................ 252/301.4 P

*Primary Examiner*—Jack Cooper
*Attorney, Agent, or Firm*—Elizabeth A. Levy

[57] ABSTRACT

A lanthanum cerium terbium gadolinium phosphate phosphor has the composition $La_{1-x-y-z}Ce_xTb_yGd_zPO_4$, where $x=0.2$ to $0.45$, $y=0.127$ to $0.137$, and $z=0.001$ to $0.1$. The phosphor has improved brightness and/or maintenance over a lanthanum cerium terbium phosphate phosphor without gadolinium. The phosphor can be prepared by reacting a lanthanum cerium terbium gadolinium oxide with boron phosphate in the presence of a flux forming compound containing lithium in an inert or reducing atmosphere.

13 Claims, 1 Drawing Sheet

METHOD OF MAKING LANTHANUM CERIUM TERBIUM GADOLINIUM PHOSPHATE PHOSPHOR

TECHNICAL FIELD

The invention relates to a lanthanum cerium terbium gadolinium phosphate phosphor. Such a phosphor is useful in a fluorescent lamp.

BACKGROUND OF THE INVENTION

A lanthanum cerium terbium phosphate phosphor is disclosed in U.S. Pat. No. 4,423,349 to Nakajima et al.

Nakajima et al. disclose, however, that when a small amount of gadolinium is added to the composition, the brightness of the phosphor is less than that of the phosphor without the gadolinium. See Table 5, particularly column 6, line 58 (second entry in Table) and column 7, line 5.

SUMMARY OF THE INVENTION

The phosphor of the instant invention is a green-emitting lanthanum cerium terbium gadolinium phosphate fluorescent lamp phosphor.

We have found that in a phosphor having a composition different from that disclosed in Nakajima et al., the addition of gadolinium can be beneficial. The brightness and/or the maintenance can be improved.

In accordance with one aspect of the invention, there is provided a lanthanum cerium terbium gadolinium phosphate phosphor having the composition $La_{1-x-y-z}Ce_xTb_yGd_zPO_4$, where $x=0.2$ to 0.45, $y=0.127$ to 0.137, and $z=0.001$ to 0.1.

In accordance with another aspect of the invention, there is provided a fluorescent lamp comprising a lanthanum cerium terbium gadolinium phosphate phosphor having the composition $La_{1-x-y-z}Ce_xTb_yGd_zPO_4$, where $x=0.2$ to 0.45, $y=0.127$ to 0.137, and $z=0.001$ to 0.1.

In accordance with another aspect of the invention, there is provided a method of making a lanthanum cerium terbium gadolinium phosphate phosphor having the composition $La_{1-x-y-z}Ce_xTb_yGd_zPO_4$, where $x=0.2$ to 0.45, $y=0.127$ to 0.137, and $z=0.001$ to 0.1, comprising the steps of: providing a lanthanum cerium terbium gadolinium oxide, reacting said lanthanum cerium terbium gadolinium oxide with boron phosphate in the presence of a flux-forming compound to form a mixture comprising lanthanum cerium terbium gadolinium phosphate phosphor, boron oxide and dissociated ions from the flux-forming compound, and separating the lanthanum cerium terbium gadolinium phosphate phosphor from the boron oxide and the dissociated ions.

In accordance with another aspect of the invention, there is provided a method of making a lanthanum cerium terbium gadolinium phosphate phosphor having the composition $La_{1-x-y-z}Ce_xTb_yGd_zPO_4$, where $x=0.2$ to 0.45, $y=0.127$ to 0.137, and $z=0.001$ to 0.1, comprising the steps of: combining gadolinium oxide with lanthanum cerium terbium oxide to form a uniform mixture, reacting the mixture with boron phosphate in the presence of a flux-forming compound to form a mixture comprising lanthanum cerium terbium gadolinium phosphate phosphor, boron oxide and dissociated ions from the flux-forming compound, and separating the lanthanum cerium terbium gadolinium phosphate phosphor from the boron oxide and the dissociated ions.

DETAILED DESCRIPTION OF THE INVENTION

Figure 1:
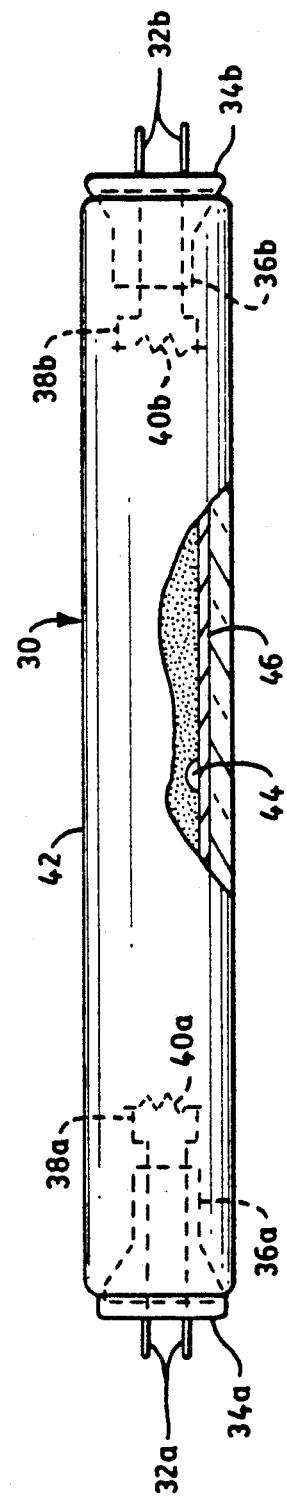
FIG. 1 is a drawing of a fluorescent lamp coated with a lanthanum cerium terbium gadolinium phosphate phosphor.

For a better understanding of the present invention, together with other and further objects, advantages and capabilities thereof, reference is made to the following disclosure and appended claims.

A method of the present invention is a synthesis whereby rare earth compounds are reacted with boron phosphate ($BPO_4$) in the presence of a flux-forming compound containing lithium.

A preferred flux-forming compound is lithium carbonate, $Li_2CO_3$. Dissociated lithium ions from the flux-forming compound may improve the solubility of the rare earth phosphate in the boron oxide solution formed during the reaction.

The rare earth raw materials may be a single phase material of lanthanum cerium terbium gadolinium oxide having the composition $(La_{1-x-y-z}Ce_xTb_yGd_z)_2O_3$ where $x=0.2$ to 0.45, $y=0.127$ to 0.137, and $z=0.001$ to 0.1. A preferred lanthanum cerium terbium gadolinium oxide has the composition $(La_{0.368}Ce_{0.42}Tb_{0.132}Gd_{0.08})_2O_3$ and is commercially available from Rhone-Poulenc, Inc. or may be made as described herein. Alternatively, the individual oxides of lanthanum, cerium, terbium and gadolinium, each available from Rhone-Poulenc, Inc., may be used.

Boron phosphate may be obtained commercially from either Gallard/Schlesinger Industries, Inc. (Carle Place, N.Y.) or Bodman Chemicals (Aston, Pa.). Alternatively, boron phosphate may be made by heating a 1.1:1.0 mixture of boric acid ($H_3BO_3$), available from Allpro Chemical Co. (Phillipsburg, N.J.), and diammonium phosphate (($NH_4$)$_2HPO_4$), available from J. T. Baker Chemical Co. (Phillipsburg, N.J.), at 700° C. to 1000° C. for 2 hours.

The rare earth oxide and the boron phosphate may be combined in near-stoichiometric proportions.

The rare earth oxide or oxides, boron phosphate, and the flux-forming compound are fired at between 1150° C. and 1300° C. for between 1.5 and 4 hours in a slightly reducing or inert atmosphere. Preferred firing conditions are a temperature of 1200° C. for a time of 2 hours.

After firing, the phosphor is washed in basic and acidic solutions to remove any residual boron and lithium compound impurities.

FIG. 1 illustrates a fluorescent lamp 30 comprising a transparent, light-transmitting sealed envelope 42, preferably glass. The envelope 42 is fitted at each end with mounts comprising electrodes 40a and 40b, re-entrant stem presses 36a and 36b and lead-in conductors 38a and 38b. Base caps 34a and 34b and pins 32a and 32b are provided at each end of the envelope 42, together with a small charge of mercury 44 within the envelope 42.

The inner surface of the envelope 42 is coated with a phosphor layer 46 which includes the lanthanum cerium terbium gadolinium phosphate phosphor as described herein.

The following non-limiting examples are presented.

In Example 1, a lanthanum cerium terbium phosphate phosphor without gadolinium was prepared as a control. In Examples 2-8, a lanthanum cerium terbium gadolinium oxalate was coprecipitated from a nitric acid solution of individual lanthanum, cerium, terbium and gadolinium oxides. The oxalate was heated at elevated temperatures to form a lanthanum cerium terbium gadolinium oxide, which was then fired with boron phosphate and lithium carbonate to form a lanthanum cerium terbium gadolinium phosphate phosphor.

EXAMPLE 1

A. Preparation of Lanthanum Cerium Terbium Oxide

The following raw materials were used in the following proportions: 147.4 grams of lanthanum oxide, $La_2O_3$; 49.92 grams of terbium oxide, $Tb_4O_7$; 368.4 grams of cerium nitrate hexahydrate, $Ce(NO_3)_3.6H_2O$; and 403.42 grams of oxalic acid, $H_2C_2O_4$. The molar ratios of the raw materials were thus 0.448 mole of lanthanum, 0.42 mole of cerium, 0.132 mole of terbium, and 1.6 moles of oxalic acid.

The terbium oxide was dissolved in one liter of hot (100° C.) nitric acid, $HNO_3$. The lanthanum oxide was then slowly added to this solution. Three liters of cold deionized water were then added, and the solution was allowed to cool to 40° C. The cerium nitrate hexahydrate was then added to the cooled solution. A clear, colorless solution resulted.

In a separate container, the oxalic acid was dissolved in four liters of deionized water. This oxalic acid solution was then added to the terbium/lanthanum/cerium/nitric solution, both solutions being maintained at room temperature. A white lanthanum cerium terbium oxalate coprecipitate having the formulation $(La_{0.448}Ce_{0.42}Tb_{0.132})_2(C_2O_4)_3$ was formed. The coprecipitate was then filtered, dried and heated at 800° C. for 2 hours to form a lanthanum cerium terbium oxide having the formulation $(La_{0.448}Ce_{0.42}Tb_{0.132})_2O_3$.

B. Preparation of Lanthanum Cerium Terbium Phosphate Phosphor

The following raw materials were combined in a plastic V-blender: 333 grams of lanthanum cerium terbium oxide; 219.14 grams of boron phosphate, $BPO_4$; and 3.65 grams of lithium carbonate, $Li_2CO_3$. The molar ratios of the raw materials were thus 1.0 mole of lanthanum cerium terbium oxide, 1.05 moles of boron phosphate, and 0.025 mole of lithium carbonate (0.05 mole of lithium ions).

The raw materials were V-blended for 15 minutes and then blended for 5 minutes with an intensifying bar, followed by 15 minutes of V-blending,to form a uniform mixture. The mixture was then fired at 1200° C. for 2 hours in a 10% hydrogen/90% nitrogen atmosphere to form the phosphor, which had the formulation $La_{0.448}Ce_{0.42}Tb_{0.132}PO_4$. The fired phosphor cake was broken up and washed in dilute nitric acid at 100° C. for 4 hours, followed by three washes in deionized water. The washed phosphor was finally washed in a solution of 5% ammonium hydroxide, filtered, and washed in hot deionized water. The filtered phosphor was dried at 110° C. for 12 hours and sifted through a 378 mesh nylon screen.

EXAMPLE 2

A. Preparation of Lanthanum Cerium Terbium Gadolinium Oxide

The following raw materials were used in the following proportions: 145.79 grams of lanthanum oxide, 1.812 grams of gadolinium oxide, 368.44 grams of cerium nitrate hexahydrate, 49.92 grams of terbium oxide, and 403.42 grams of oxalic acid. The molar ratios of the raw materials were thus 0.443 mole of lanthanum, 0.42 mole of cerium, 0.132 mole of terbium, 0.005 mole of gadolinium, and 1.6 moles of oxalic acid.

The terbium oxide was dissolved in one liter of hot (100° C.) nitric acid. The lanthanum oxide and gadolinium oxide were then slowly added to this solution. Three liters of cold deionized water were then added, and the solution was allowed to cool to 40° C. The cerium nitrate hexahydrate was then added to the cooled solution. A clear, colorless solution resulted.

In a separate container, the oxalic acid was dissolved in four liters of deionized water. This oxalic acid solution was then added to the terbium/lanthanum/cerium/gadolinium nitric solution, both solutions being maintained at room temperature. A white lanthanum cerium terbium gadolinium oxalate coprecipitate having the formulation $(La_{0.443}Ce_{0.42}Tb_{0.132}Gd_{0.005})_2(C_2O_4)_3$ was formed. The coprecipitate was then filtered, dried and heated at 800° C. for 2 hours to form a lanthanum cerium terbium gadolinium oxide having the formulation $(La_{0.443}Ce_{0.42}Tb_{0.132}Gd_{0.005})_2O_3$.

B. Preparation of Lanthanum Cerium Terbium Gadolinium Phosphate Phosphor

The following raw materials were combined in a plastic V-blender: 333 grams of lanthanum cerium terbium gadolinium oxide, 219.14 grams of boron phosphate, and 3.65 grams of lithium carbonate. The molar ratios of the raw materials were thus 1.0 mole of lanthanum cerium terbium gadolinium oxide, 1.05 moles of boron phosphate, and 0.025 mole of lithium carbonate (0.05 mole of lithium ions). The raw materials were V-blended for 15 minutes and then blended for 5 minutes with an intensifying bar, followed by 15 minutes of V-blending, to form a uniform mixture. The mixture was then fired at 1200° C. for 2 hours in a 10% hydrogen/90% nitrogen atmosphere to form the phosphor, which had the formulation $La_{0.443}Ce_{0.42}Tb_{0.132}Gd_{0.005}PO_4$. The fired phosphor cake was broken up and washed in dilute nitric acid at 100° C. for 4 hours, followed by three washes in deionized water. The washed phosphor was finally washed in a solution of 5% ammonium hydroxide, filtered, and washed in hot deionized water. The filtered phosphor was dried at 110° C. for 12 hours and sifted through a 378 mesh nylon screen.

EXAMPLE 3

The procedure of Example 2 was followed, with the following exception: the amount of gadolinium oxide used was increased to 3.625 grams, or 0.01 mole of gadolinium. The amount of lanthanum oxide was descreased accordingly, to 144.15 grams, or 0.438 mole of lanthanum. The resulting phosphor had the formulation $La_{0.438}Ce_{0.42}Tb_{0.132}Gd_{0.01}PO_4$.

EXAMPLE 4

The procedure of Example 2 was followed, with the following exception: the amount of gadolinium oxide used was increased to 7.25 grams, or 0.02 mole of gadolinium. The amount of lanthanum oxide was decreased accordingly, to 140.86 grams, or 0.428 mole of lanthanum. The resulting phosphor had the formulation $La_{0.428}Ce_{0.42}Tb_{0.132}Gd_{0.02}PO_4$.

EXAMPLE 5

The procedure of Example 2 was followed, with the following exception: the amount of gadolinium oxide used was increased to 10.87 grams, or 0.03 mole of gadolinium. The amount of lanthanum oxide was decreased accordingly, to 137.57 grams, or 0.418 mole of lanthanum. The resulting phosphor had the formulation $La_{0.418}Ce_{0.42}Tb_{0.132}Gd_{0.03}PO_4$.

EXAMPLE 6

The procedure of Example 2 was followed, with the following exception: the amount of gadolinium oxide used was increased to 14.499 grams, or 0.04 mole of gadolinium. The amount of lanthanum oxide was decreased accordingly, to 134.28 grams, or 0.408 mole of lanthanum. The resulting phosphor had the formulation $La_{0.408}Ce_{0.42}Tb_{0.132}Gd_{0.04}PO_4$.

EXAMPLE 7

The procedure of Example 2 was followed, with the following exception: the amount of gadolinium oxide used was increased to 28.99 grams, or 0.08 mole of gadolinium. The amount of lanthanum oxide was decreased accordingly, to 121.11 grams, or 0.368 mole of lanthanum. The resulting phosphor had the formulation $La_{0.368}Ce_{0.42}Tb_{0.132}Gd_{0.08}PO_4$.

EXAMPLE 8

The procedure of Example 2 was followed, with the following exception: the amount of gadolinium oxide used was increased to 54.37 grams, or 0.15 mole of gadolinium. The amount of lanthanum oxide was decreased accordingly, to 98.08 grams, or 0.298 mole of lanthanum. The resulting phosphor had the formulation $La_{0.298}Ce_{0.42}Tb_{0.132}Gd_{0.15}PO_4$.

Relative brightness values for the various gadolinium concentrations are given in Table I.

TABLE I

RELATIVE BRIGHTNESS OF $LaCeTbPO_4$ PHOSPHOR AND $LaCeTbGdPO_4$ PHOSPHOR FROM LaCeTbGd OXIDE

| Gd CONCENTRATION | RELATIVE BRIGHTNESS, % |
| --- | --- |
| CONTROL (NO Gd) | 100 |
| 0.005 mole Gd | 100.1 |
| 0.01 mole Gd | 100.1 |
| 0.02 mole Gd | 100.1 |
| 0.03 mole Gd | 100.8 |
| 0.04 mole Gd | 100.5 |
| 0.08 mole Gd | 101.8 |
| 0.15 mole Gd | 100.7 |

Table I indicates that the optimum phosphor brightness was obtained with a gadolinium concentration of 0.08 mole.

Fluorescent test lamps were prepared by conventional lamp manufacturing techniques with the phosphors of Examples 1-8 and measured for brightness at 0, 100 and 500 hours. The results are given in Table II.

TABLE II

20W T12 FLUORESCENT LAMP BRIGHTNESS OF $LaTbCeGdPO_4$ PHOSPHOR

| Gd CONC. (moles) | BRIGHTNESS | | | MAINTENANCE | |
| --- | --- | --- | --- | --- | --- |
| | 0 HR | 100 HR | 500 HR | 100 HR (%) | 500 HR (%) |
| 0 | 4593 | 4442 | 4318 | 96.7 | 94.8 |
| 0.005 | 4828 | 4695 | 4603 | 96.3 | 95.3 |
| 0.01 | 4831 | 4750 | 4666 | 97.4 | 96.6 |
| 0.02 | 4770 | 4668 | 4531 | 97.9 | 95.8 |
| 0.03 | 4811 | 4659 | 4548 | 95.9 | 94.5 |
| 0.04 | 4783 | 4662 | 4534 | 96.6 | 94.8 |
| 0.08 | 4842 | 4718 | 4565 | 96.5 | 94.3 |
| 0.15 | 4819 | 4675 | 4526 | 96.1 | 93.9 |

Table II indicates that the addition of gadolinium to a lanthanum cerium terbium phosphate phosphor improved the initial, 100-hour and 500-hour brightness of fluorescent lamps made with the phosphor.

In Examples 9-11 a lanthanum cerium terbium gadolinium phosphate phosphor was prepared by adding gadolinium oxide to a lanthanum cerium terbium oxide coprecipitate purchased from Rhone-Poulenc, Inc.

EXAMPLE 9

The following raw materials were combined in a plastic V-blender: 373.55 grams of lanthanum cerium terbium oxide, $(La_{0.45}Ce_{0.42}Tb_{0.13})_2O_3$, 2.25 grams of gadolinium oxide, 249.72 grams of boron phosphate, and 4.15 grams of lithium carbonate. The molar ratios of the raw materials were thus one mole of lanthanum cerium terbium oxide, 0.006 mole of gadolinium, 1.05 moles of boron phosphate, and 0.025 mole of lithium carbonate (0.05 mole of lithium ions).

The raw materials were V-blended for 15 minutes and then blended for 5 minutes with an intensifying bar, followed by 15 minutes of V-blending, to form a uniform mixture. The mixture was then fired at 1200° C. for 2 hours in a 10% hydrogen/90% nitrogen atmosphere to form the phosphor, which had the formulation $La_{0.444}Ce_{0.42}Tb_{0.13}Gd_{0.006}PO_4$. The fired phosphor cake was broken up and washed in dilute nitric acid at 100° C. for 4 hours, followed by three washes in deionized water. The washed phosphor was finally washed in a solution of 5% ammonium hydroxide, filtered, and washed in hot deionized water. The filtered phosphor was dried at 110° C. for 12 hours and sifted through a 378 mesh nylon screen.

EXAMPLE 10

The procedure of Example 9 was followed, except that the amount of gadolinium oxide was increased to 7.49 grams, or 0.02 mole of gadolinium. The resulting phosphor had the formulation $La_{0.43}Ce_{0.42}Tb_{0.13}Gd_{0.02}PO_4$.

EXAMPLE 11

The procedure of Example 9 was followed, except that the amount of gadolinium oxide was increased to 22.5 grams, or 0.06 mole of gadolinium. The resulting phosphor had the formulation $La_{0.39}Ce_{0.42}Tb_{0.13}Gd_{0.06}PO_4$.

Relative brightness values for the various gadolinium concentrations are given in Table III.

TABLE III

RELATIVE BRIGHTNESS OF $LaCeTbPO_4$ PHOSPHOR AND $LaCeTbGdPO_4$ PHOSPHOR WHEN GADOLINIUM OXIDE WAS ADDED TO LaCeTb OXIDE

| Gd CONCENTRATION | RELATIVE BRIGHTNESS, % |
| --- | --- |
| CONTROL (NO Gd) | 100 |
| 0.006 mole Gd | 102.9 |

TABLE III-continued
RELATIVE BRIGHTNESS OF LaCeTbPO$_4$ PHOSPHOR AND LaCeTbGdPO$_4$ PHOSPHOR WHEN GADOLINIUM OXIDE WAS ADDED TO LaCeTb OXIDE

| Gd CONCENTRATION | RELATIVE BRIGHTNESS, % |
|---|---|
| 0.02 mole Gd | 100.5 |
| 0.06 mole Gd | 98.5 |

Table III indicates that the optimum phosphor brightness was obtained with a gadolinium concentration of 0.006 mole. Less gadolinium was required to improve brightness when the gadolinium was added as a gadolinium oxide to a lanthanum cerium terbium oxide, than when a lanthanum cerium terbium gadolinium oxide was prepared. While not wishing to be bound by theory, it is believed that the distribution of Gd$^{+3}$ ions is more random when the phosphor is prepared from the lanthanum cerium terbium gadolinium oxide. With a more random distribution of gadolinium ions, the probability is lower that gadolinium ions will be found in close proximity to each other. Thus, higher concentrations of gadolinium in the coprecipitated rare earth oxide may be required to promote gadolinium ion pairing, which promotes energy transfer between gadolinium and terbium.

Fluorescent test lamps were prepared by conventional lamp manufacturing techniques with the phosphors of Examples 9-11 and measured for brightness at 0 and 100 hours. The results are given in Table IV.

TABLE IV
20W T12 FLUORESCENT LAMP BRIGHTNESS OF LaTbCeGdPO$_4$ PHOSPHOR WHEN GADOLINIUM OXIDE WAS ADDED TO LaCeTb OXIDE

| Gd CONC. (moles) | 0 HR | 100 HR | 100 HR MAINT (%) |
|---|---|---|---|
| 0 | 4852 | 4684 | 96.5 |
| 0.006 | 4835 | 4734 | 97.9 |
| 0.02 | 4822 | 4694 | 97.3 |
| 0.06 | 4712 | 4580 | 97.2 |

Table IV indicates that the addition of small molar amounts of gadolinium to the lanthanum cerium terbium oxide resulted in a slight decrease in initial brightness, but an increase in 100-hour brightness for all but the greatest concentration of gadolinium, and also in 100-hour maintenance. The brightness and maintenance improvements were greatest with smaller amounts of gadolinium.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method of making a lanthanum cerium terbium gadolinium phosphate phosphor having the composition La$_{1-x-y-z}$Ce$_x$Tb$_y$Gd$_z$PO$_4$, where $x=0.2$ to $0.45$, $y=0.127$ to $0.137$, and $z=0.001$ to $0.1$, comprising the steps of: providing a lanthanum cerium terbium gadolinium oxide; reacting said lanthanum cerium terbium gadolinium oxide with boron phosphate in the presence of a flux forming compound containing lithium at between 1150° C. and 1300° C. in either an inert or a reducing atmosphere to form a mixture comprising lanthanum cerium terbium gadolinium phosphate phosphor, boron oxide and dissociated ions from said flux-forming compound; and separating said lanthanum cerium terbium gadolinium phosphate phosphor from said boron oxide and said dissociated ions.

2. A method according to claim 1 wherein said lanthanum cerium terbium gadolinium oxide is prepared by coprecipitating a lanthanum cerium terbium gadolinium oxalate from a nitric acid solution comprising the individual oxides of lanthanum, cerium, terbium and gadolinium, heating said lanthanum cerium terbium gadolinium oxalate at 800° C. for two hours to form said lanthanum cerium terbium gadolinium oxide.

3. A method according to claim 1 wherein $x=0.42$, $y=0.132$ and $z=0.08$.

4. A method according to claim 1 wherein said lanthanum cerium terbium gadolinium oxide and said boron phosphate are provided in near stoichiometric proportions.

5. A method according to claim 1 wherein said flux-forming compound containing lithium is lithium carbonate and said dissociated ions comprise lithium ions.

6. A method according to claim 1 wherein said reaction step occurs for between 1.5 and 4 hours.

7. A method according to claim 1 wherein said separation step is performed by washing said phosphor in dilute nitric acid and dilute ammonium hydroxide solutions.

8. A method of making a lanthanum cerium terbium gadolinium phosphate phosphor having the composition La$_{1-x-y-z}$Ce$_x$Tb$_y$Gd$_z$PO$_4$, where $x=0.2$ to $0.45$, $y=0.127$ to $0.137$, and $z=0.001$ to $0.1$, comprising the steps of: combining gadolinium oxide with lanthanum cerium terbium oxide to form a uniform mixture; reacting said mixture with boron phosphate in the presence of a flux-forming compound containing lithium at between 1150° C. and 1300° C. in either an inert or a reducing atmosphere to form a mixture comprising lanthanum cerium terbium gadolinium phosphate phosphor, boron oxide and dissociated ions from said flux-forming compound; and separating said lanthanum cerium terbium gadolinium phosphate phoshor from said boron oxide and said dissociated ions.

9. A method according to claim 8 wherein $x=0.42$, $y=0.13$, and $z=0.006$.

10. A method according to claim 8 wherein said lanthanum cerium terbium oxide and said boron phosphate are provided in near stoichiometric proportions.

11. A method according to claim 8 wherein said flux-forming compound containing lithium is lithium carbonate and said dissociated ions comprise lithium ions.

12. A method according to claim 8 wherein said reaction step occurs for between 1.5 and 4 hours.

13. A method according to claim 8 wherein said separation step is performed by washing said phosphor in dilute nitric acid and dilute ammonium hydroxide solutions.

* * * * *